United States Patent [19]

Sasajima et al.

[11] Patent Number: 5,014,574
[45] Date of Patent: May 14, 1991

[54] SPEED CONTROL APPARATUS FOR A CONTINUOUSLY VARIABLE SPEED

[75] Inventors: Koji Sasajima, Tokyo; Kazuya Maki, Aichi; Kouji Yamaguchi, Saitama, all of Japan

[73] Assignee: Honda Giken Kogyo Kabushiki Kaisha, Tokyo, Japan

[21] Appl. No.: 267,496

[22] Filed: Nov. 4, 1988

[30] Foreign Application Priority Data

Nov. 5, 1987 [JP] Japan .................. 62-279632

[51] Int. Cl.$^5$ ........................... B60K 41/12
[52] U.S. Cl. ........................ 74/866; 74/861
[58] Field of Search .............. 74/861, 862, 866

[56] References Cited

U.S. PATENT DOCUMENTS

| | | | |
|---|---|---|---|
| 4,023,442 | 5/1977 | Woods et al. | 74/861 X |
| 4,261,229 | 4/1981 | Mizuno et al. | 74/866 |
| 4,481,844 | 11/1984 | Ironside et al. | 74/862 X |
| 4,561,327 | 12/1985 | Niwa et al. | 74/866 |
| 4,584,907 | 4/1986 | Niwa et al. | 74/862 X |
| 4,631,980 | 12/1986 | Ishimori | 74/730 |
| 4,631,982 | 12/1986 | Miki et al. | 74/862 X |
| 4,641,553 | 2/1987 | Kobayashi | 74/866 |
| 4,648,040 | 3/1987 | Cornell | 74/866 X |
| 4,683,779 | 8/1987 | Osanai et al. | 74/861 |
| 4,730,522 | 3/1988 | Morimoto | 74/868 |
| 4,829,433 | 5/1989 | Nakano et al. | 364/424.1 |

FOREIGN PATENT DOCUMENTS

| | | |
|---|---|---|
| 0044202 | 1/1982 | European Pat. Off. . |
| 0198694 | 10/1986 | European Pat. Off. . |
| 0231059 | 8/1987 | European Pat. Off. . |
| 58-191360 | 11/1983 | Japan . |
| 60-95263 | 5/1985 | Japan . |
| 62-83228 | 4/1987 | Japan . |
| 62-83229 | 4/1987 | Japan . |
| 62-204052 | 9/1987 | Japan . |

Primary Examiner—Dwight Diehl
Attorney, Agent, or Firm—Lyon & Lyon

[57] ABSTRACT

A speed control apparatus for a continuously variable speed transmission comprises ratio control units for controlling a speed reduction ratio and a manual value for selecting either a running range where engine power is transmitted to the wheels or a neutral range where the engine power is not transmitted to the wheels. The speed reduction ratio is controlled by the ratio control units so as to coincide with a reference speed reduction ratio corresponding to the vehicle speed detected by a speed sensor when the neutral range is selected by manual valve.

9 Claims, 6 Drawing Sheets

SPEED CONTROL APPARATUS FOR A CONTINUOUSLY VARIABLE SPEED

BACKGROUND OF THE INVENTION

The invention relates to a speed control apparatus for a continuously variable speed transmission that permit continuously variable speed transmission of engine power to driving wheels.

In a continuously variable speed transmission for a vehicle the speed reduction ratio {=(input speed)/(output speed)} is set such that it is a maximum while the transmission is in a neutral range so that a smooth starting of a vehicle can be effected, as shown in Japanese Patent Laid Open Publication No. 58(1982)-191360.

During driving, a driver sometimes moves a shift lever from a forward range position to a neutral range position and then back to the forward range position. On such an occasion speed reduction ratio is made maximum for the neutral range, the engine brake is enhanced very much, or the engine speed is undesirably increased, when the shift lever is shifted back to the forward range position to provide power transmission from the engine to the wheels.

In connection with this problem, the Applicant has proposed a method for keeping the speed reduction ratio unchanged if the transmission is shifted from forward to neutral during running, and for preventing excessive engine braking when shifted back again to forward (Japanese Patent Laid Open Publication No. 62(1987)-204052).

The above mentioned speed control apparatus works well when successive shifting of the lever from forward to neutral and back to forward is performed in a short time, so that the vehicle speed at shifting to neutral is not very different from the speed at shifting back to forward. However, when the two speeds are very different, the engine braking effect may become undesirable and driving feeling may be deteriorated.

SUMMARY OF THE INVENTION

It is an object of the invention to solve such problems encountered on such occasions as when the shift lever is shifted from a running range position (the forward or reverse range position) to the neutral range position and back to the running range position again, by providing a speed control apparatus for allowing an appropriate engine brake effect and for providing comfortable driving feeling in accordance with the vehicle speed.

As a means for accomplishing the above object, a speed control apparatus according to the invention comprises ratio control means for controlling the speed reduction ratio of a transmission, range selection means for selecting either a running range that permits transmission of engine power to wheels or a neutral range that shuts off the transmission of engine power, and speed sensing means for detecting vehicle speed. The speed control apparatus can provide a reference speed reduction ratio in accordance with the vehicle speed as detected by the speed sensing means when the neutral range has been chosen by the range selection means.

With the speed control apparatus according to this invention, the power transmission between the engine and the wheels is shut off, for example, by disconnecting the clutch when the shift lever is shifted to the neutral position during running. In the neutral range, the change in the speed reduction ratio does not affect the vehicle speed. Thereafter, by virtue of the speed control apparatus, the speed reduction ratio of the continuously variable speed transmission is maintained to coincide with the reference speed reduction ratio determined based on the vehicle speed, as long as the neutral range is maintained. Consequently, when the transmission is shifted again from neutral to forward, the vehicle runs with a speed reduction ratio appropriate for the vehicle speed at the moment, so that the engine brake is moderately effectuated in correspondence with the vehicle speed even when there is a big difference between the vehicle speed at the time of shifting from forward to neutral and the speed at the time of shifting from back neutral to forward.

Further scope of the applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying drawings which are given by way of illustration only, and thus are not limitative of the scope of the present invention and wherein.

DETAILED DESCRIPTION OF THE PREFERRED EMBODIMENTS

Figure 1:
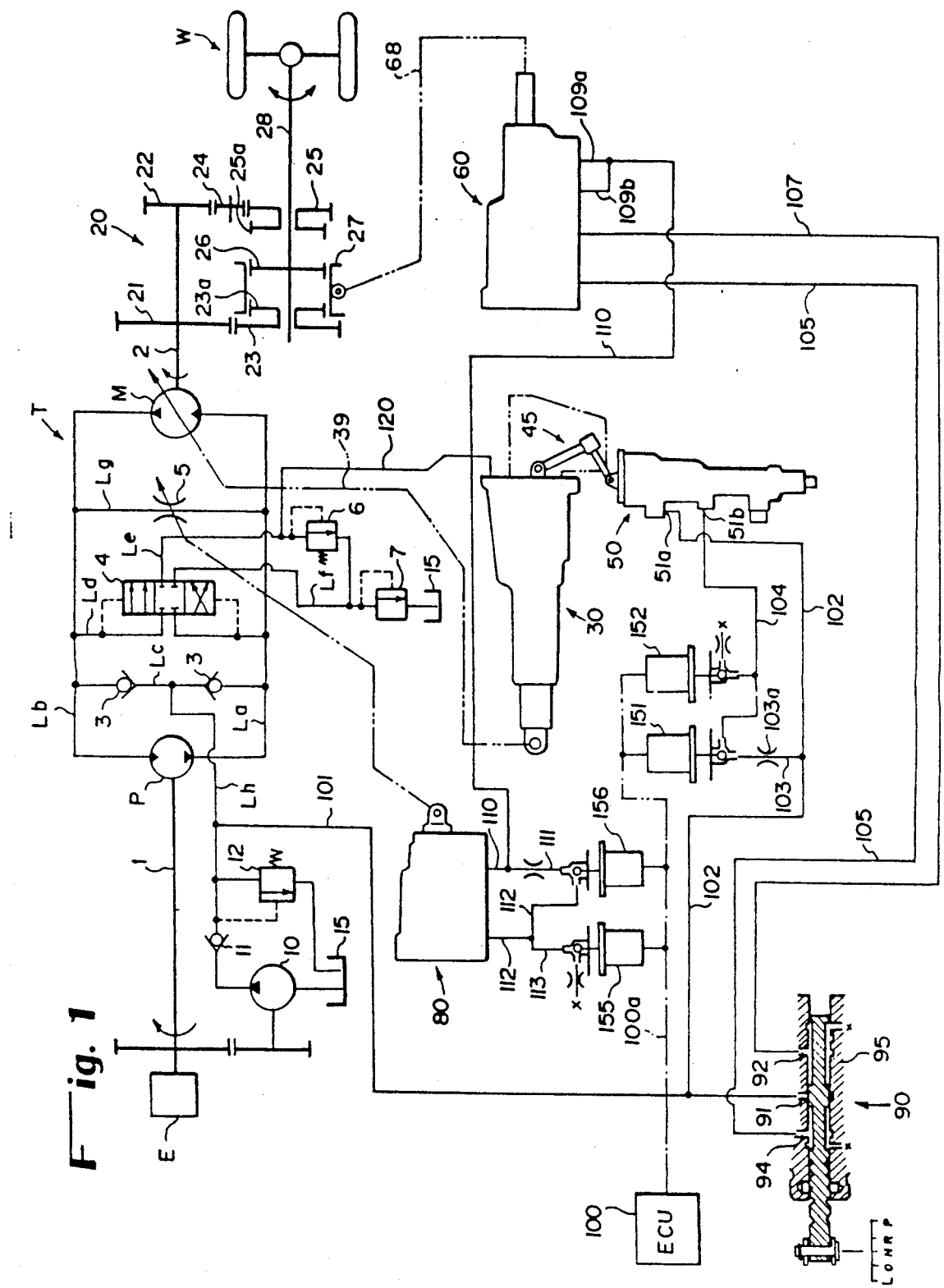
FIG. 1 is a schematic diagram of a hydraulic circuit for a continuously variable speed transmission which is equipped with a speed control apparatus according to the invention.

A hydraulic circuit diagram of a continously variable speed transmission with a speed control apparatus in accordance with the present invention is presented in FIG. 1 wherein the continuously variable speed transmission T has a constant displacement swash plate type axial plunger hydraulic pump P driven by an engine E through an input shaft 1 and a variable displacement swash plate type axial plunger hydraulic motor M which drives wheels W through a directional change unit 20. The pump P and motor M are connected with each other by means of two hydraulic lines La and Lb composing a closed hydraulic circuit wherein the first line La connects the pump outlet port to the motor inlet port and the second line Lb connects the pump inlet port to the motor outlet port.

A charge pump 10 driven by the engine E is connected to the closed circuit through a charge hydraulic line Lh having a check valve 11 and through a third hydraulic line Lc having a pair of check valves 3. Hydraulic oil pumped up by the charge pump 10 from an oil sump 15 and regulated as to its pressure by a charge pressure relief valve 12 is supplied to the one of the two hydraulic lines La, Lb which has lower pressure through the check valves 3. A fourth hydraulic line Ld having a shuttle valve 4 is connected to the closed circuit. To the shuttle valve 4 is connected a fifth and a sixth hydraulic line Le and Lf which respectively have a high pressure relief valve 6 and a low pressure relief valve 7 with outlets to the oil sump 15. The shuttle valve 4 is a 2-port 3-position selector valve, which is operated in response to a hydraulic pressure difference of the first and second hydraulic lines La and Lb to shift to either of the extreme positions to connect either of the first or second hydraulic lines La, Lb having higher pressure with the fifth hydraulic line Le as well as to connect the other hydraulic line La or Lb having lower pressure with the sixth hydraulic line Lf. Therefore, the relief pressure of a higher pressure line is regulated by the high pressure relief valve 6, and the relief hydraulic pressure of the other, lower pressure line is regulated by the low pressure relief valve 7. When the pressures in hydraulic lines La and Lb are equal, the valve 4 is in the central position for closing the line Ld.

Between the first and second hydraulic lines La and Lb is provided a seventh hydraulic line Lg to short-circuit the two lines. The seventh hydraulic line Lg is provided with a clutch valve 5, which is a variable opening control valve to control the opening degree of the line.

An output shaft 28 connected to the wheels W is placed in parallel with the drive shaft 2 of the hydraulic motor M. A directional change gear unit 20 is placed between these two shaft 2,28. This gear unit 20 comprises a first and a second drive gear 21,22 firmly mounted on the drive shaft 2 leaving an axial space therebetween, a first driven gear 23 rotatably mounted on the output shaft 28 and engaged with the first drive gear 21, a second driven gear 25 rotatably mounted on the output shaft 28 and engaged with an intermediate gear 24 which is engaged with the second drive gear 22, a clutch hub 26 placed between the first and second driven gears 23, 25 and firmly mounted on the output shaft 28, and a sleeve 27 slidably mounted on the clutch hub 25 which can be selectively engaged with the clutch gears 23a, 25a formed on the sides of the driven gears 23, 25. In the directional change gear unit 20, when the sleeve 27 is slid leftward, the clutch gear 23a of the first driven gear 23 is connected to the clutch hub 25 by means of the sleeve 27 (as shown in FIG. 1). Hence the rotational direction of the output shaft 28 is opposite to that of the drive shaft 2 and the wheels W are driven forward by the continuously variable speed transmission T. On the other hand, when the sleeve 27 is slid rightward, the clutch gear 25a of the second driven gear 25 is connected to the clutch hub 26 by means of the sleeve 27. Hence, the rotational direction of the output shaft 28 is the same as that of the drive shaft 2 and the wheels W are driven backward.

In FIG. 1, with the directional change gear unit 20, the directional control servo unit 60 acts as an actuator to axially move the sleeve 27 for directional control of the vehicle. The first and second ratio control servo units 30 and 50, connected with each other by the link mechanism 40, control the speed reduction ratio of the continuously variable speed transmission T by controlling the displacement of the hydraulic motor M. The hydraulic motor M is a swash plate type axial piston motor the displacement of which is controlled through its swash plate angle by the servo units 30 and 50. The clutch valve 5 is operationally controlled by the clutch servo unit 80.

The operations of the ratio control servo units 30 and 50 and the clutch servo unit 80 are controlled by pairs of solenoid valves 151, 152 and 155, 156 which in turn are duty-ratio controlled by signals transmitted from the controller 100. The controller 100 receives signals corresponding to a vehicle speed V, an engine speed Ne, a throttle opening degree $\theta$th, a swash plate tilt angle $\theta$tr, and a manual shift lever position Psl, and transmits such signals as to control the respective solenoid valves of the above functions to effectuate desirable traveling characteristics.

The directional control servo unit 60 is controlled by hydraulic fluid fed from a manual valve 90 which is operated by the shift lever. In the manual valve 90, there are five shift positions "L, D, N, R, P" which are selected in accordance with the positions of the shift lever, the "N" and "P" positions representing a neutral range and the "L", "D" and "R" positions representing running ranges ("L" and "D" being forward ranges and "R" being a reverse range). Therefore, the manual valve 90 acts as range selection means for selecting either running ranges or a neutral range.

The structures and operations of the above servo units 30, 50, 60 and 80 are described in detail below.

Figure 2:
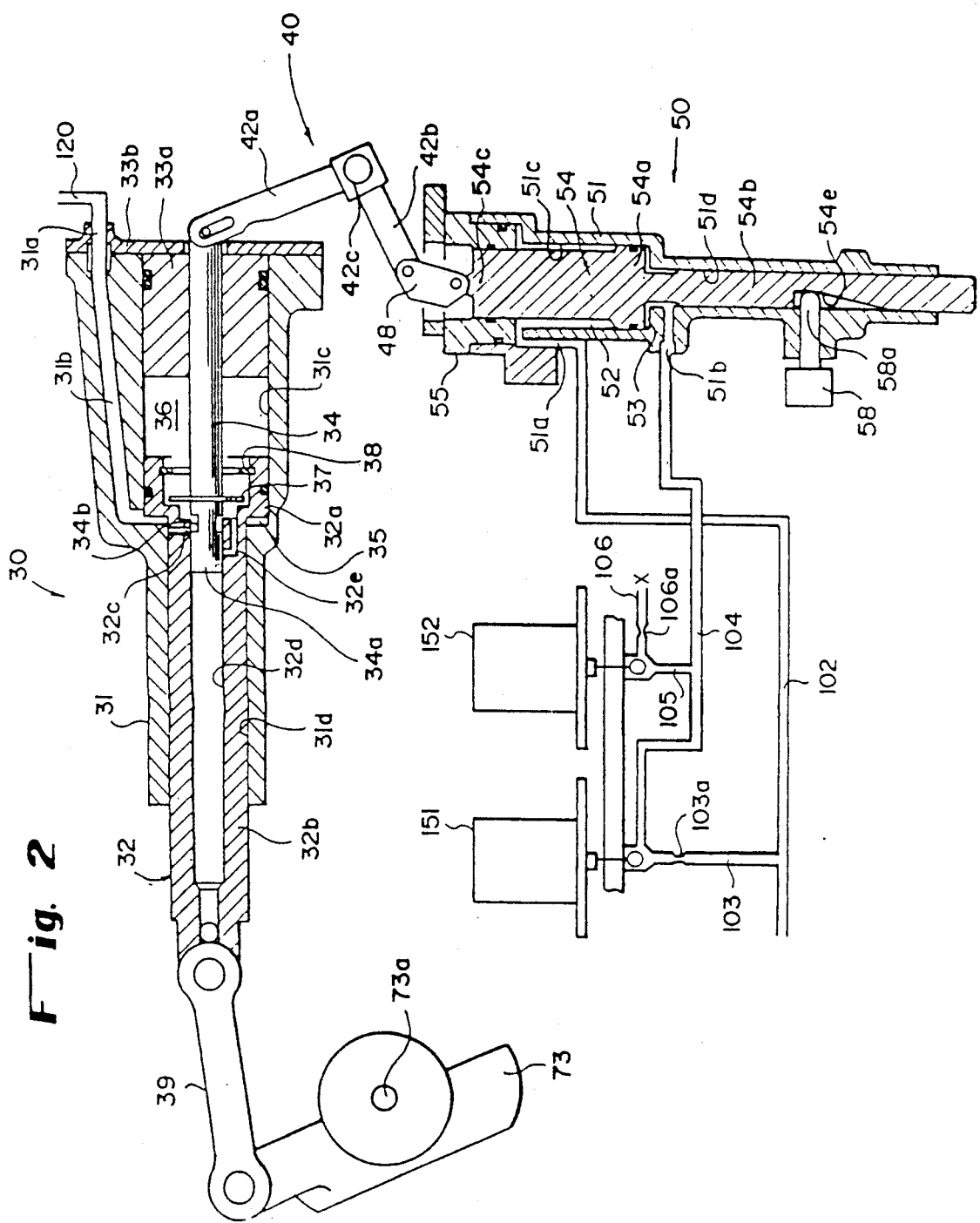
FIG. 2 is a cross sectional view of a first and a second ratio control servo unit.

Referring first to the ratio control servo units 30, 50 shown in FIG. 2, the first ratio control servo unit 30 controls the swash plate angle of the hydraulic motor M with the help of the high hydraulic pressure fed from the closed hydraulic circuit of the transmission T through the shuttle valve 4, the fifth line Le and a high pressure line 120. The second ratio control servo unit 50 is connected to the first ratio control servo unit 30 by a link mechanism 40 and controls the operation of the first ratio control servo unit 30.

The first ratio control servo unit 30 comprises a housing 31 having a connection port 31a connected to the high pressure line 120, a piston member 32 slidably inserted into the housing 31, and a spool member 34 slidably and coaxially inserted into the piston member 32. The piston member 32 consists of a piston portion 32a formed at its right end and a rod portion 32b coaxially extending leftward. The piston portion 32a is fitted into a cylinder hole 31c of the housing 31 and divides the space inside the cylinder hole 31c into two chambers defining two cylinder chambers 35, 36. The rod portion 32b having a smaller diameter than that of the cylinder hole 31c is inserted into a rod hole 31d which is concentric with the cylinder hole 31c. The right cylinder chamber 36 is covered by a plug member 33a and cover 33b through which the right end of the spool member 34 protrudes.

The high pressure line 120 connected to the port 31a communicates with the left cylinder chamber 35 through a hydraulic line 31b. The piston member 32 is pushed rightward by the hydraulic pressure fed in the left cylinder chamber 35 through the high pressure line 120.

A land portion 34a which is inserted in a spool hole 32d is formed at the left end of the spool member 34. A pair of dents 34b with fixed axial widths is formed at the right side of the land portion 34a. A stop ring 37 mounted on the spool member 34 hits against a stop ring 38 mounted on the inside surface of the piston member 32 before the spool member 34 comes out.

A drain passage 32e which can connect the right cylinder chamber 36 to the oil sump (not shown) through the spool hole 32d in response to rightward motion of the spool member 34 and a connection passage 32c which can connects the left cylinder chamber 35 to the right cylinder chamber 36 through the dents 34b responding to the leftward motion of the spool member 34 are formed in the piston member 32.

When the spool member 34 is moved rightward, the land portion 34a blocks the connection passage 32c and opens the drain passage 32e. Accordingly the hydraulic pressure fed through the high pressure line 120 is led in the left cylinder chamber 35 and pushes the piston member 32 rightward so that the piston member 32 follows the spool member 34. When the spool member 34 is moved leftward, the connection passage 32c is communicated with the right cylinder chamber 36 through the dents 34b and the drain passage 32e is blocked by the land portion 34a. Accordingly the high hydraulic pressure is fed to both the left and right cylinder chambers 35, 36. The piston member 32 is pushed leftward because of the difference in areas where pressure applied and therefore the piston member 32 is moved so as to follow the spool member 34.

When the spool member 34 is held still, the piston member 32 is also held still creating a hydraulically balanced state because of pressure balance between the left and right cylinder chambers 35, 36.

As discussed, when the spool member 34 is moved leftward or rightward, the piston member 32 is moved laterally so as to follow the spool member 34 with the help of the high hydraulic pressure fed through the high pressure line 120. Accordingly the variable displacement of the motor M is controlled by the motion of the spool member 34 since the piston member 32 is connected to the swash plate 73 of the motor M by means of a link member 39.

The spool member 34 is linked to the second servo unit 50 by means of link mechanism 40. The link mechanism 40 includes a first link member 42 being swingable around an axis 42c and having two arms 42a and 42b perpendicular to each other, and a second link member 48 pivotally connected to the arm 42b. The upper end of the arm 42a is pivotally connected to the right end of the spool member 34. The bottom end of the second link member 48 is pivotally connected to a spool member 54 of the second servo unit 50. Therefore when the spool member 54 of the second servo unit 50 is moved up or down, the spool member 34 of the first servo unit 30 is moved rightward or leftward.

The second servo unit 50 comprises a housing 51 having ports 51a, 51b to which hydraulic lines 102, 104 are connected respectively, and the spool member 54 vertically slidably fitted in the housing 51. The spool member 54 consists of a piston portion 54a, an end spool portion 54b coaxially extending downward and a rod portion 54c coaxially extending upward therefrom. The piston portion 54a is inserted into a cylinder hole 51c of the housing 51 and divides the space inside the cylinder hole 51c covered by a cover 55 into two chambers defining a upper and a lower cylinder chamber 52, 53. The end spool portion 54b is inserted into a rod hole 51d which is concentric with the cylinder hole 51c and extends downward.

A spool 58a of a top position detecting switch 58 is projected into a recess 54e formed on the end spool portion 54b. The spool 58a is pushed up along the tapered surface of the recess 54e when the spool member 54 is moved up. Therefore it can be found by the top position detecting switch 58a if the speed reduction ratio has become minimum since the pushed-up spool 58a turns the switch 58 on.

Further, the hydraulic lines 102, 104 are communicated with the upper and lower cylinder chambers 52, 53 through the ports 51a, 51b. The spool member 54 is moved up or down by the difference of hydraulic forces applied to the piston portion 54a which are determined based on the differences of hydraulic pressures and of areas where the hydraulic pressures in the cylinder chambers 52, 53 are applied. The up and down motions of the spool member 54 are transmitted to the spool member 34 of the first servo unit 30 by the link mechanism 40 causing right and left motions of the spool member 34. In other words, the control of the hydraulic pressures supplied through the hydraulic lines 102, 104 enables control of the motion of the spool member 34 and the piston member 32 in the first servo unit 30 and also enables to control the swash plate angle of the hydraulic motor M and the displacement thereof. In fact, when the spool member 54 of the second servo unit 50 is moved up, the piston member 32 of the first servo unit 30 is moved rightward lessening the swash plate angle, the displacement of the hydraulic motor M and the speed reduction ratio.

As shown in FIG. 1, hydraulic oil whose pressure is regulated by the charge pressure relief valve 12 is led to the hydraulic line 102 through a hydraulic line 101. Hydraulic oil in the hydraulic line 102 is led to the hydraulic line 104 through a hydraulic line 103 having an orifice 103a, and the hydraulic pressure in the hydraulic line 104 is controlled by the two solenoid valves 151, 152 which are operated based on duty cycle signals from the controller 100. Accordingly it is said that the signals from the controller 100 control the operations of the first and second servo units 30, 50 and consequently adjust the displacement of the hydraulic motor M.

Figure 3:
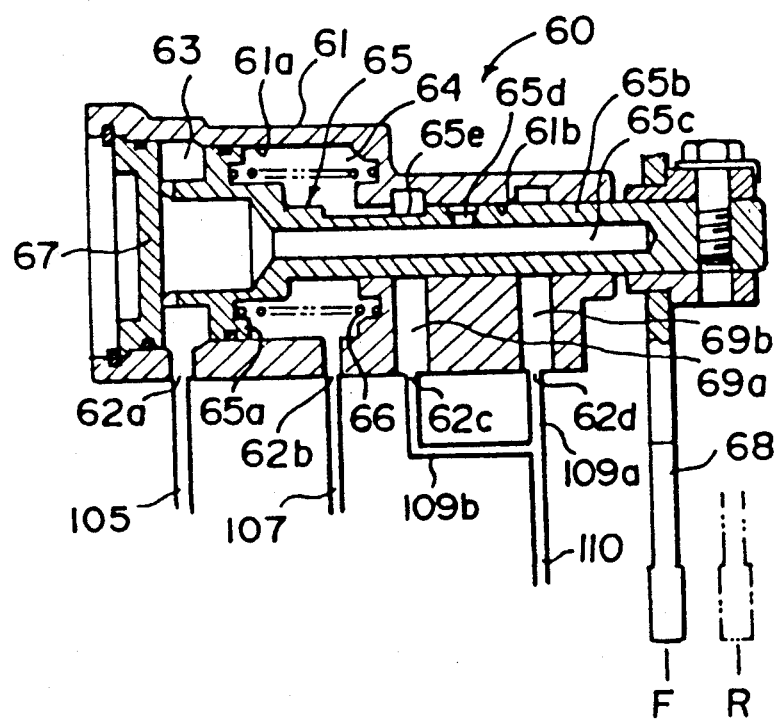
FIG. 3 is a cross sectional view of a directional control servo unit.

Referring next to the construction of FIG. 3: The directional control servo valve 60 comprises a housing 61 and a spool member 65. The housing 61 has four ports 62a, 62b, 62c and 62d to which the lines 105, 107, 109 and 109a as shown in FIG. 1 are connected respectively. The spool member 65 consists of a piston portion 65a and a rod portion 65b coaxially extending rightward.

The piston portion 65a is laterally and slidably inserted into a cylinder hole 61a of the housing 61 and divides the inside of the cylinder hole 61a covered by a cover 67 into two chambers defining a left and a right cylinder chamber 63, 64. The rod portion 65b is inserted into a rod hole 61b which is concentric with the cylinder hole 61a and extends rightward. The right end of the rod portion 65b extends outward from the right side of the housing 61. A shift fork 68 which can move the sleeve 27 of the directional change unit laterally is fixed to the right end of the rod portion 65b.

In the spool member 65, a connection hole 65c extending axially and being opened to the left end is formed. A valve hole 65d drilled to the external surface of the rod portion 65b is connected to the connection hole 65c. The spool member 65 is pushed leftward by a spring 66 placed in the right cylinder chamber 64.

The directional control servo valve 60 is actuated by the hydraulic pressure fed to the left or right cylinder chamber 63, 64 through either of the hydraulic lines 105, 107 according to the action of the manual valve 90. The hydraulic line 105 is connected to the reverse port 94 of the manual valve 90. The hydraulic line 107 is connected to the forward port 92 of the manual valve 90. The spool 95 of the manual valve 90 is moved in accordance with the actuation of the manual shift lever placed in the driver's compartment. When the shift lever is positioned at "D" or "L", the inlet port 91 communicates with the forward port 92. When the shift lever is positioned at "R", the inlet port 91 communicates with the reverse port 94. When it is positioned at "N" or "P", the inlet port 91 is closed and the forward port 92 and the reverse port 94 are connected to drain ports.

The inlet port 91 communicates with the charge line Lh which has the hydraulic pressure regulated by the charge pressure relief valve 12. When the shift lever is positioned at the "D" or "L" position, the reverse port 94 communicates with the drain port and the forward port 92 communicates with the inlet port 91. Then the hydraulic oil in the left cylinder chamber 63 is exhausted through the drain port and the hydraulic oil from the charge line Lh is supplied into the right cylinder chamber 64. Accordingly the hydraulic pressure in the right cylinder chamber 64 pushes the spool member 65 and the shift fork 68 leftward, and therefore the sleeve 27 is moved to the forward position in the directional change unit 20 (see FIG. 1). The right cylinder chamber 64 communicates with a conduit 69a, which communicates with the port 62c, through a dent 65e. Accordingly, the hydraulic fluid in the right cylinder chamber 64 is fed to the line 110 through the line 109b.

When the shift lever is moved to a "N" position, the inlet port 91 is closed and the other ports 92 and 94 communicate with the drain ports as shown in FIG. 1. Therefore the hydraulic pressures in the left and the right cylinder chambers 63, 64 become "zero". However the spool member 65 is kept at the left position by the biasing force of the spring 66 and accordingly the sleeve 27 of the directional change unit 20 is kept at the forward position. The hydraulic pressure in the line 110 is also "zero". Even if the shift lever is at the "N" position, the directional gear unit is kept at the forward range. However, as described later, the clutch valve is opened by the clutch servo unit 80, and the transmission of engine power to the wheels W is prevented.

When the shift lever is moved to the "R" position, the inlet port 91 communicates with the reverse side port 94 and the port 92, communicates with the drain ports. Therefore the hydraulic oil having the charge pressure from the charge line Lh is directed to the left cylinder chamber 63 but the right cylinder chamber 64 still communicates with the drain port. The spool member 65 and the shift fork 68 are pushed rightward by the charge pressure in the left cylinder chamber 63 and accordingly the sleeve 27 of the directional change unit 20 is moved to the reverse position. A valve hole 65d of the spool member 65 communicates with a conduit 69b which is connected to the port 62d. The hydraulic fluid in the left cylinder chamber 63 is fed to the line 110 through the conduit 65c, the valve hole 65d, the conduit 69b and the line 109a.

Figure 4:
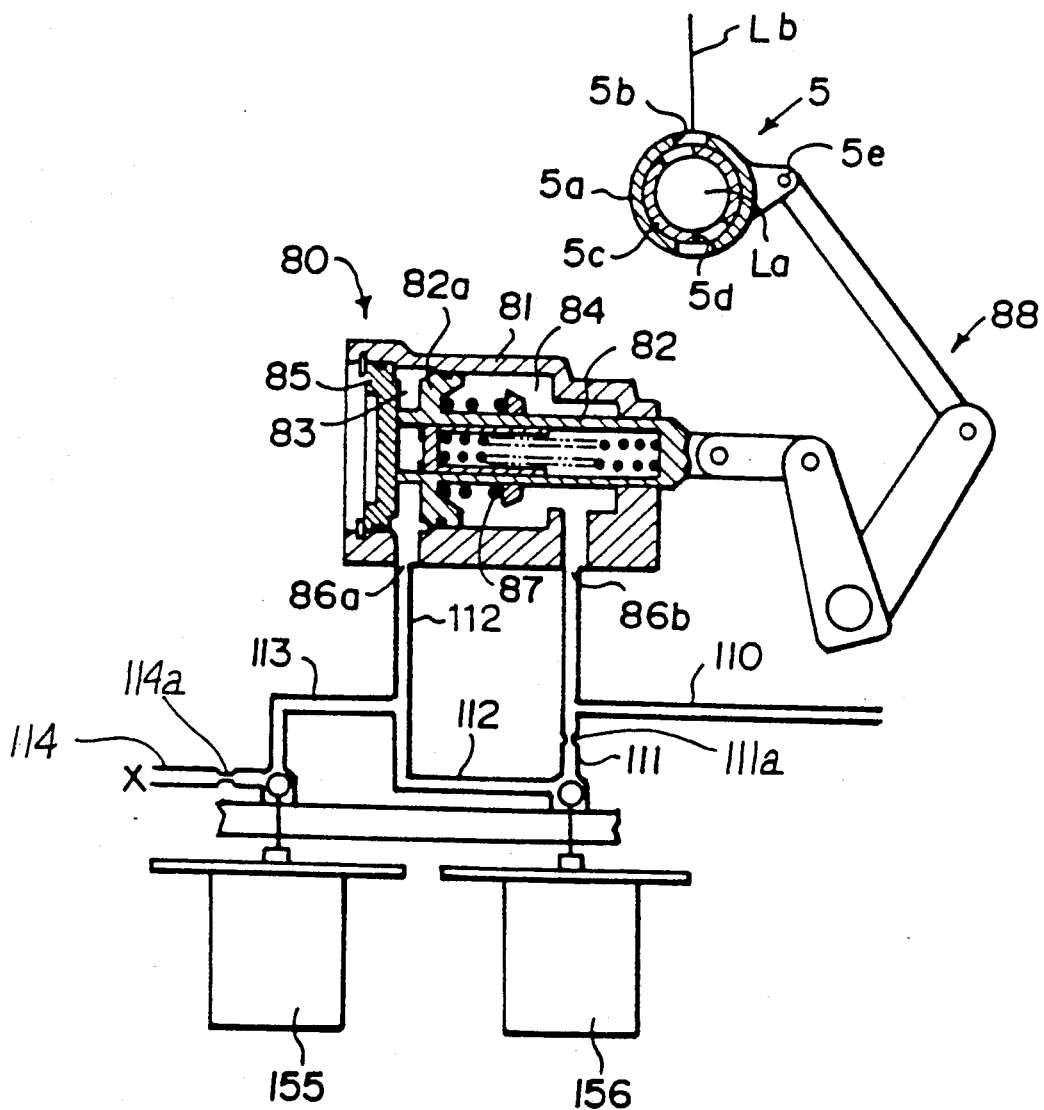
FIG. 4 is a cross sectional view of a clutch servo unit.

The following is a detailed description of the construction of the clutch servo unit 80 based on FIG. 4. The clutch servo unit 80 consists of a cylinder member 81, a piston member 82 inserted in the cylinder member 81 slidably to the right and left in FIG. 2, a cover member 85 fixed to cover the cylinder chamber into which the piston member 82 is inserted, and a spring 87 pushing the piston member 82 to the left in FIG. 2. A piston 82a on the piston member 82 divides the cylinder chamber 81 into a left cylinder chamber 83 and a right cylinder chamber 84 to which hydraulic lines 112 and 110 are respectively connected via respective ports 86a and 86b.

The hydraulic line 110 communicates with the charge line Lh through the directional servo unit 60 and the manual valve 90. Therefore, hydraulic fluid having charge pressure is fed to the line 110 when the running range is selected (or the manual valve is at the "L", "D" or "R" position). When the neutral range is selected the line 110 communicates with the drain and the pressure therein is "zero". Hydraulic fluid in the line 110 is fed to the line 112 through the line 111 (having an orifice) and the two solenoid valves 155, 156. Therefore, the pressure in the line 112 is controlled by the duty-ratio control of the solenoid valves 155, 156. The solenoid valve 156 is provided to control the flow rate of the hydraulic oil flowing from the line 111 (having the orifice 111a therein) to the line 112 based on the duty ratio signals. The solenoid valve 155 is disposed between a hydraulic line 113 diverging from the line 112 and a hydraulic line 114 communicating with the drain through an orifice 114a, to control the flow of the hydraulic oil from the line 113 to the drain based on the duty signals.

Therefore, when the running range is selected, to the right cylinder chamber 84 via the line 110 is applied the charge pressure regulated by the charge pressure relief valve 12, while to the left cylinder chamber 83 is applied a pressure from the line 112 lower than the charge pressure, by the action of the aforesaid two solenoid valves 155 and 156. In this connection, the force applied on the piston member 82 from the right side (that is, a force due to the hydraulic pressure P1 in the right cylinder chamber 84 plus the force of the spring 87) balances with the force applied on the piston member 82 from the left side (that is, a force due to the hydraulic pressure P2 in the left cylinder chamber 83), even though P2 is lower than P1, because the area of the right cylinder chamber 84 subject to oil pressure is designed to be much smaller than that of the left cylinder chamber 83. Therefore, if the solenoid valves 155 and 156 control the hydraulic pressure in the left cylinder chamber 83 supplied from the line 112 so as to be larger than the balancing pressure P2, the piston member 82 will be moved to the right, while when the solenoid valves 155 and 156 control the hydraulic pressure in the left cylinder chamber 83 supplied from the line 112 so as to be smaller than the pressure P2, the piston member 82 will be moved to the left.

The movement of the piston member 82 to the left or right is transmitted to the clutch valve 5 through a link 88. The clutch valve 5 consists of a stationary member 5a having a first valve port 5b therein, and a rotary member 5c having a second valve port 5d rotatably inserted in the stationary member 5a. An arm 5e engaging with the rotary member 5c is connected to the aforesaid link 88, thus allowing a rotation of the rotary member 5c in accordance with the movement of the aforesaid piston member 82. When the rotary member 5c is rotated, the communication between the first and second valve ports 5b and 5d varies from "fully open" to "fully closed". When the piston member 82 is moved to the leftmost as shown in FIG. 2, the communication in the clutch valve 5 is "fully open", while as the piston member 82 moves to the right, the communication varies gradually to "fully closed".

Because the first valve port 5*b* communicates with the first line La and the second valve port 5*d* communicates with the second line Lb constituting the hydraulic closed-circuit, the variation in the communication between the aforesaid first and second valve ports 5*b* and 5*d* can change the opening degree of the seventh line Lg or the short circuit line of the first and second lines La and Lb, thus effecting clutch control. In other words, when the running range is selected, based on signals from the controller 100, duty-ratio control of the aforesaid solenoid valves 155 and 156 can perform a successful clutch control. When the neutral range is selected, the pressures in the left and right cylinder chambers 83, 84 are "zero". Accordingly, the piston member 82 is moved to the left by the spring 87, opening the clutch valve 5 fully.

In such a continuously variable speed transmission having the construction as described above, each of the solenoid valves 151, 152, 155 and 156 receives from the controller 100 driving signals for their duty ratio control, which results in the reduction ratio control and the clutch opening control, and hence the speed control of the vehicle.

Figure 5:
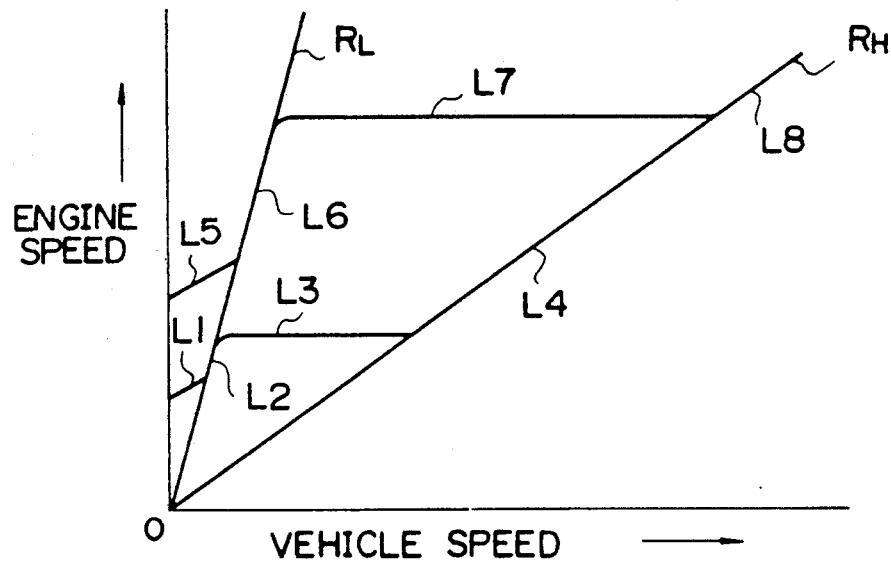
FIG. 5 and FIG. 7 are graphs showing the traveling characteristics of the vehicle having the above mentioned continuously variable speed transmission.

In this speed control, if the driving range is selected, the clutch opening control is conducted at the time of starting and stopping of the vehicle. Then the speed reduction ratio is so controlled that an actual engine speed coincides with a reference engine speed, which is set in accordance with a parameter representing a driver's intention of acceleration, for example, an engine throttle opening, an accelerator opening, etc. For instance suppose that the vehicle is at rest with the clutch valve 5 being virtually fully open and the speed reduction ratio being maximum (a condition as marked by a straight line $R_L$) as shown in FIG. 5, and then the manual valve 90 is shifted to the D position and the accelerator pedal is depressed to make the throttle opening large. Then the speed control apparatus will provide a control so as to increase the vehicle speed while keeping the engine speed matched with the reference engine speed which is set in correspondence to the parameter representing the driver's intention of acceleration. The vehicle speed will be changed as shown in the figure from L1 (clutch valve closed) to L2 (increasing the vehicle speed by increasing the engine speed under the maximum reduction ratio) to L3 (increasing the vehicle speed by decreasing the reduction ratio under a constant engine speed) to L4 and L8 (increasing the vehicle speed by depressing the accelerator pedal to increase the engine speed under the minimum reduction ratio). It should be understood that the mode of the speed variation from L1 through L8 may change according to how fast the accelerator pedal is depressed. For example, if the accelerator pedal is depressed quickly, the clutch connection and the change in the speed reduction ratio will take place at a higher engine speed than just discussed above, so that the mode may be L5 to L6 to L7 to L8 as shown in the figure.

Figure 6:
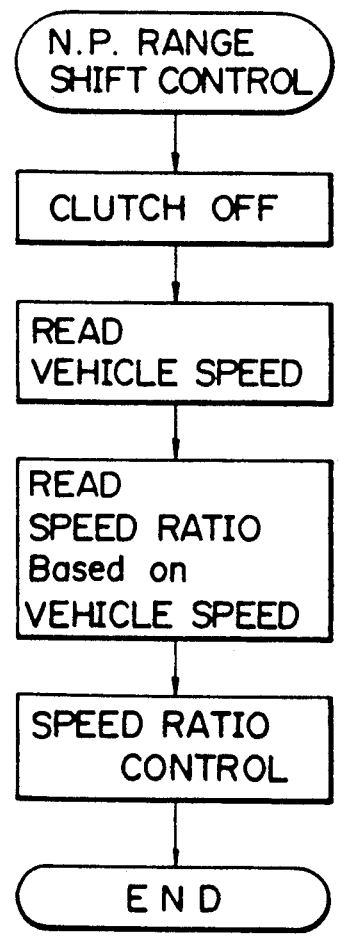
FIG. 6 is a flow chart illustrating the scheme of the control given by the speed control apparatus according to the invention.

Referring to the flow chart of FIG. 6, the control operation provided in a case of shifting the manual valve 90 from the D position (driving range) to the N position while running is now described.

As the manual valve 90 is shifted to the N position, the hydraulic pressure in the hydraulic line 110 drops to zero, so that the clutch valve 5 is fully opened by the clutch servo valve 80, making the clutch disconnected (i.e. the clutch is turned OFF). At the same time a vehicle speed at that moment is detected and a signal corresponding to the vehicle speed is sent to the control apparatus so that the actual speed reduction ratio coincides with a the reference speed reduction ratio which has been determined corresponding to the vehicle speed preset in tabular form.

Figure 7:
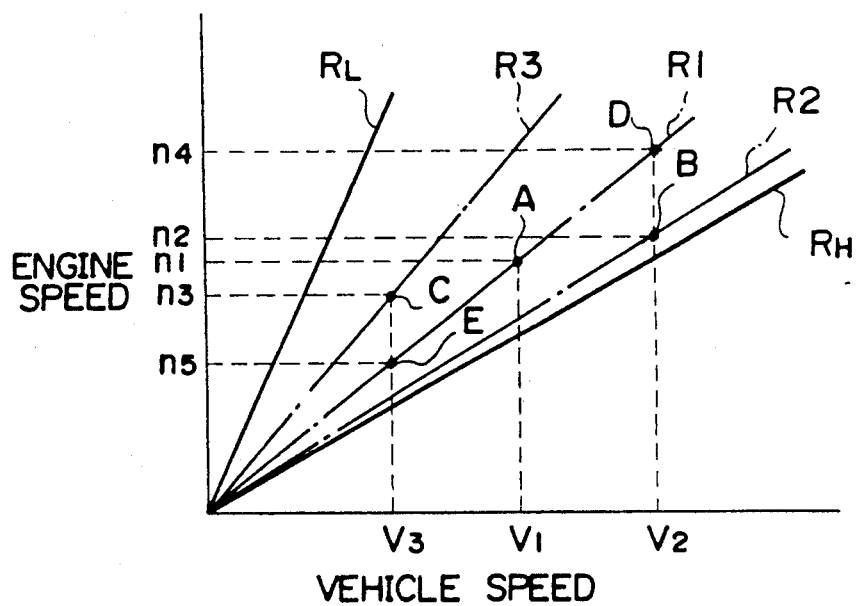

More particularly as shown in FIG. 7, as the manual valve 90 is shifted to the N position, i.e. the neutral range is selected, while running under a state marked by "A" (the vehicle speed: $V_1$, the speed reduction ratio: $R_1$), the above mentioned speed control follows thereafter. Hence, if the vehicle speed is increased to $V_2$, for example when running downhill, the speed reduction ratio is controlled to coincide with the speed reduction ratio $R_2$ which has been preset for the vehicle speed $V_2$. Consequently, if the manual valve 90 is again shifted back to the D position under this condition, the engine speed will become $n_2$ corresponding to the state "B". In contrast, if the reduction ratio is maintained as in conventional cases at the ratio set at the time of shifting to the neutral range, the state of the vehicle will be "D", for which the engine speed, is $n_4$, thus causing an excessive engine brake effect.

Contrary to the above case, if the manual valve 90 is shifted back to the D position when the vehicle speed is reduced to $V_3$ after the valve 90 was shifted to the neutral range during running at the state "A" in FIG. 7, the speed control apparatus according to the invention will set the speed reduction ratio $R_3$ corresponding to this vehicle speed $V_3$, realizing the state "C" for which the engine speed is $n_3$. However, in conventional control which retains the speed reduction ratio unchanged, the state would be "E" for which the engine speed is as small as $n_5$, and the engine brake effect would be too weak. Namely, by means of the speed control apparatus according to the invention, an adequate engine brake will be secured, particularly in a case where the transmission is shifted from the running range to the neutral range while running and shifted back to the running range, without causing excessive increase or decrease of the engine speed.

Although the invention has been described above only for a hydraulic continuously variable speed transmission, it is apparent that the invention can be utilized for other types of continuously variable speed transmission as well.

As described above, according to the invention, a continuously variable speed transmission is controlled in such a way that its speed reduction ratio is controlled to match the speed reduction ratio which is set in accordance to the vehicle speed, so that the vehicle is always driven at an adequate speed reduction ratio corresponding to the vehicle speed at that moment. Therefore, if for example, there arises a great difference in vehicle speed before and after the shift of the transmission from the running range to the neutral range and back to the running range to get the power from the engine to the wheels, the engine brake is effected in harmony with the vehicle speed at the moment of shifting to the running range, preventing the engine brake from being too strong or too weak.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A speed control apparatus for a continuously variable speed transmission that variably transmits engine power to driving wheels of a vehicle, comprising:

ratio control means for controlling a speed reduction ratio of said continuously variable speed transmission;

range selecting means for selecting either of a running rate where the engine power is transmitted to the wheels through said continuously variable speed transmission and a neutral range where the engine power is prevented from being transmitted to the wheels; and speed sensing means for detecting a vehicle speed;

characterized in that, while said neutral range is selected by said range selection means, the speed reduction ratio of said continuously speed variable transmission is controlled by said ratio control means so as to coincide with a reference speed reduction ratio determined corresponding to the vehicle speed; and while the neutral range is selected the speed reduction ratio is maintained at a ratio appropriate for the vehicle speed at the moment so as to provide appropriate engine braking on reselecting the running range.

2. A speed control apparatus as defined in claim 1, wherein said continously variable speed transmission is a hydraulic continuously variable speed transmission comprising a hydraulic pump driven by said engine and a hydraulic motor driven by hydraulic pressure fed from said hydraulic pump, and said control of the speed reduction ratio is carried out by varying the displacement of at least one of said hydraulic pump and hydraulic motor.

3. A speed control apparatus as claimed in claim 2, wherein while said neutral range is selected the speed reduction ratio is set to lower values as the vehicle speed increases and the speed reduction ratio is set to higher values as the vehicle speed decreases.

4. A speed control apparatus as claimed in claim 1, wherein while said neutral range is selected the speed reduction ratio is set to lower values as the vehicle speed increases and the speed reduction ratio is set to higher values as the vehicle speed decreases.

5. A speed control apparatus as claimed in claim 3, wherein while said neutral range is selected the speed reduction ratio is set to lower values as the vehicle speed increases and the speed reduction ratio is set to higher values as the vehicle speed decreases.

6. A speed control apparatus for a continuously variable transmission that variably transmits engine power of an engine in a vehicle to driving wheels of the vehicle, comprising:

range selecting means for selecting either of a running range where the engine power is transmitted to the wheels through said continuously variable transmission and a neutral range where the engine power is prevented from being transmitted to the wheels, speed sensing means for detecting a vehicle speed, and ratio control means for controlling a speed reduction ratio of said continuously variable transmission according to the range selected by said range selecting means, wherein when the neutral range is selected, the speed reduction ratio is controlled so as to coincide with a reference speed reduction ratio determined according to said vehicle speed, said reference reduction ratio being independent of an actual engine speed of the engine, wherein when the neutral range is selected, the ratio control means controls the speed reduction ratio according to an actual vehicle speed at the moment the control is made, so as to provide appropriate engine braking on re-selecting the run.

7. A speed control apparatus according to claim 6, wherein when the neutral range is selected, the reference speed reduction ratio is determined so as to decrease as said vehicle speed increases and to increase as said vehicle speed decreases.

8. A speed control apparatus according to claim 8, wherein when the neutral range is selected, the reference speed reduction ratio is determined so as to decrease as said vehicle speed increases and to increase as said vehicle speed decreases.

9. A speed control apparatus according to claim 1 or 6, wherein the reference speed reduction ratios are preset for the vehicle speeds in a tabular form.

* * * * *